United States Patent
Van Den Nieuwenhuizen et al.

(10) Patent No.: US 6,498,439 B2
(45) Date of Patent: Dec. 24, 2002

(54) BALLAST FOR FEEDING A HIGH-PRESSURE GAS DISCHARGE LAMP

(75) Inventors: Hubertus Cornelis Maria Van Den Nieuwenhuizen, Eindhoven (NL); Maurice Matheas Maria Hendrikx, Oss (NL); Gerardus Hinderikus Heijne, Turnhout (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/838,888

(22) Filed: Apr. 20, 2001

(65) Prior Publication Data

US 2002/0047621 A1 Apr. 25, 2002

(30) Foreign Application Priority Data

Apr. 20, 2000 (EP) .............................................. 00201424
Jul. 28, 2000 (EP) .............................................. 00202708

(51) Int. Cl.$^7$ .............................................. H05B 37/00
(52) U.S. Cl. .............. 315/290; 315/209 R; 315/209 M; 315/340; 315/DIG. 5
(58) Field of Search ............................... 315/290, 209 R, 315/209 M, 289, 105, 340, 224, 266, DIG. 4, DIG. 7, 323

(56) References Cited

U.S. PATENT DOCUMENTS 5,233,273 A * 8/1993 Waki et al. .................. 315/224

FOREIGN PATENT DOCUMENTS

WO     WO9935890     7/1999     ........... H05B/41/24

* cited by examiner

Primary Examiner—Don Wong
Assistant Examiner—Tuyet T. Vo

(57) ABSTRACT

A ballast for feeding a high-pressure discharge lamp. The ballast:

supplies the lamp with an AC voltage at an ignition frequency ($f_i$) during an ignition period ($t_i$), supplies the lamp with an AC voltage at a glow frequency ($f_g$) during a glow period ($t_g$) following the ignition period ($t_i$), repeats the start-up sequence of ignition period and glow period ($t_i$, $t_g$), supplies the lamp with an AC voltage at an operating frequency ($f_b$) during an operating period ($t_b$) following the last start-up sequence, and interrupts the power supply to the lamp in a start-up sequence, not being the last start-up sequence, during an interruption period ($t_d$) following the glow period ($t_g$).

10 Claims, 2 Drawing Sheets

BALLAST FOR FEEDING A HIGH-PRESSURE GAS DISCHARGE LAMP

BACKGROUND OF THE INVENTION

The invention relates to a ballast for igniting and feeding a high-pressure gas discharge lamp, which ballast comprises means for supplying the lamp during an ignition period ($t_i$) with an AC voltage at an ignition frequency (fi), means for supplying the lamp with an AC voltage at a glow frequency (fg) during a glow period ($t_g$) following the ignition period (ti), means for at least repeating the start-up sequence of ignition and glow periods ($t_i$, $t_g$), and means for feeding the lamp during an operating period ($t_b$) following the last start-up sequence. Mention is made here of an ignition period ($t_i$) and a subsequent glow period ($t_g$), however, this should be construed such that, in practice, a clear distinction between these two periods cannot always be made, whereby the ignition frequency ($f_i$) and the glow frequency ($f_g$) can be variable and gradually blend with each other, or they may even be equal to each other.

The invention also relates to a projection unit provided with such a ballast.

Such a ballast is described in the international patent publication WO-99/35890 and can be used to start-up or ignite and feed a high-pressure mercury-vapor gas discharge lamp having, for example, a rated power of approximately 100 W, which is used predominantly as a (slide, sheet or LCD-screen) projection lamp. Such a lamp comprises a bulb or tube of quartz glass as the discharge vessel, which is provided on two sides with an electrode, which is made, for example, of tungsten and which has a solid core around the end portions of which a wire is wound. The discharge vessel contains a quantity of mercury. During the ignition period ($t_i$), a high voltage is generated by means of a high-frequency voltage source, resulting in a discharge arc between the electrodes. During the subsequent glow period ($t_g$), the frequency is reduced, so that the impedance in the circuit decreases and the current flowing through the lamp increases. As a result, the electrodes heat up more rapidly. The increase in temperature causes the mercury to evaporate, so that the necessary mercury vapor pressure is built up. If the electrodes are at a sufficiently high temperature, the ballast goes over to the stable operating period ($t_b$), which, in the case of the known ballast, has a comparatively low operating frequency ($f_b$). If, however, it is detected through measurements that the lamp is not burning after this start-up sequence, the start-up sequence ($t_i$, $t_g$) is automatically repeated until the lamp does burn. If the lamp still does not burn after the start-up sequence has been repeated a number of times, the start-up cycle is interrupted.

It is desirable for the discharge arc to develop along the shortest path between the two electrodes so as to make the electrodes heat up entirely. A problem concerning the start-up of such a lamp is that the discharge arc initially often develops between the rear sides of both electrodes, where no wire is wound, so that the cross-section of the electrode is smaller at said location. The mercury tends to deposit at this part, which leads to a better conduction and hence enhances the formation of a discharge arc from this location. Furthermore, the electrodes may be covered with salts, which can counteract the development of the desired discharge arc. As a result, an elongated, curved discharge arc may be formed between the rear sides of the electrodes, which may subsist also during the stable operating period, which does not lead to optimum results since the electrode is heated only partly instead of bodily because only the part of the electrode through which current flows is heated. The lamp may spontaneously go out during the start-up time because the discharge arc is too long and the temperature of the electrodes is too low, in which case the lamp has to be put into operation by hand. This problem occurs, in particular, with lamps having a high rated power and heavier electrodes, which is the reason why they have not been widely used hitherto. Lamps having such a high power comprise a plurality of layers of wound wire, leading to comparatively wide electrode end portions as compared to lamps having a lower power, so that the above problems are more likely to occur. There is, however, a need for projection lamps having such a high power, which can be used for projection representations at ambient light conditions.

SUMMARY OF THE INVENTION

It is an object of the invention to provide a measure for a ballast which can be used to ignite and feed a high-pressure gas discharge lamp, which measure counteracts the above-mentioned drawbacks and problems.

To achieve this, the ballast of the type mentioned in the opening paragraph additionally comprises means for interrupting the power supply to the lamp in a start-up sequence, which is not the last start-up sequence, during an interruption period ($t_d$) following the glow period ($t_g$). The invention thus includes an intentional interruption of the power supply during a short period of time. Preferably, the interruption period ($t_d$) is long enough to substantially de-ionize the gas contained in the lamp.

Preferably, the interruption period ($t_d$) ranges between 50 ms and 500 ms, more preferably between 250 ms and 350 ms, and most preferably approximately 300 ms. By interrupting the power supply to the lamp for a short period of time, the gas present in the lamp will no longer be ionized and the built-up, possibly suboptimal, elongated, curved discharge arc will disappear. During the preceding start-up sequence, however, the wide end portions of the electrodes are slightly heated up, and both the salts and the mercury are removed from the electrodes. This leads to better conditions for the development of a short, straight discharge arc between the closely spaced end portions of the electrodes during the subsequent start-up sequence. In general, this will cause the lamp to burn better after this second start-up sequence.

Preferably, the glow frequency ($f_g$ is smaller than the ignition frequency ($f_i$). The lower frequency causes the impedance in the circuit to be lower too, so that a higher current intensity is achieved and the electrodes heat up more rapidly.

The ignition frequency ($f_i$) preferably ranges between 30 kHz and 120 kHz, and the ignition period ($t_i$) preferably ranges between 0.25 and 5 seconds. More preferably, the ignition frequency ($f_i$) is approximately 62.5 kHz, and the ignition period ($t_i$) lasts approximately 0.5 seconds.

The glow frequency ($f_g$) ranges between 10 kHz and 40 kHz, and the glow period ($t_g$) preferably ranges between 0.4 s and 1.7 s. More preferably, the glow frequency ($f_g$) is approximately 20 kHz, and the glow period ($t_g$) lasts approximately 0.85 seconds.

Preferably, the ballast additionally comprises means capable of feeding the lamp, after the glow period ($t_g$) of the last start-up sequence during an end glow period ($t_g$), at an end glow frequency ($f_{ge}$) which is smaller than the glow frequency ($f_g$). This end glow period serves to further increase the current intensity by further reducing the resistance of the electrodes. The end glow frequency ($f_{ge}$) preferably ranges between 8 kHz and 30 kHz and the end glow period ($t_{ge}$) preferably ranges between 0.25 and 1 second. More preferably, the end glow frequency is approximately 15.5 kHz, and the end glow period lasts approximately 0.5 s.

The operating frequency ($f_b$) preferably ranges between 50 Hz and 200 Hz, more preferably the operating frequency is approximately 90 Hz.

These and other aspects of the invention will be apparent from and elucidated with reference to the embodiment(s) described hereinafter.

DESCRIPTION OF THE PREFERRED EMBODIMENT

Figure 1:
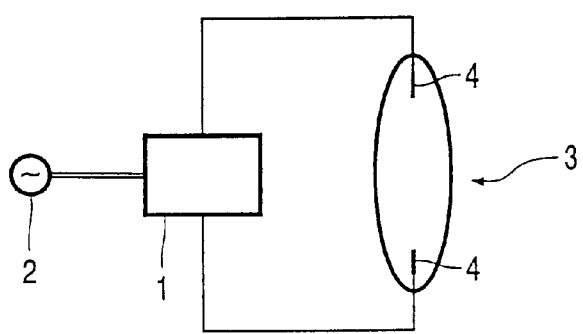
FIG. 1 diagrammatically shows a ballast in accordance with the invention for igniting and feeding a gas discharge lamp.

FIG. 1 shows a ballast 1 for feeding and igniting a high-pressure discharge lamp 3 which, for this purpose, is connected to an AC voltage source 2, such as the electricity grid. The ballast comprises means for igniting the lamp in accordance with the invention and subsequently feeding the lamp. The connected lamp is, for example, a high-pressure mercury-vapor gas discharge lamp. Output terminals of the ballast 1 are connected to electrodes 4 of the lamp 3.

Figure 2:
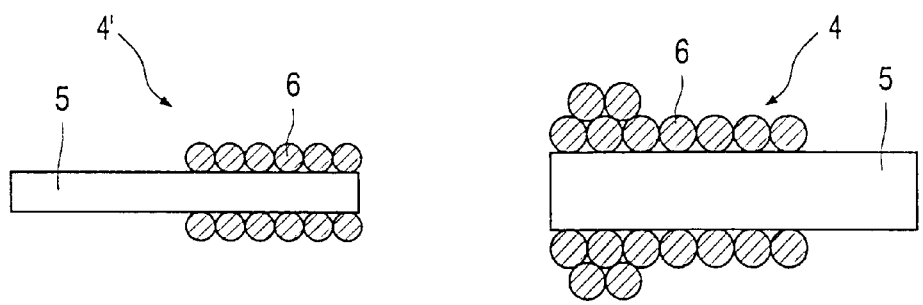
FIG. 2 diagrammatically shows, respectively, an electrode for a high-pressure mercury vapor gas discharge lamp having a comparatively low power, and an electrode for a high-pressure mercury vapor gas discharge lamp having a comparatively high power.

In accordance with FIG. 2, the electrodes 4,4' for a high-pressure mercury-vapor gas discharge lamp, which can particularly suitably be used for projection purposes, comprise a central conductive solid core 5 around the end portions of which conductive metal wire 6 are helically wound. Both the core 5 and the wire 6 are preferably made of tungsten. The helical turns of the metal wire 6 of the electrode 4 are fused with the core 5. On the left-hand side in the Figure, an electrode 4' is shown which can suitably be used in lamps having a power in the range between 100 W and 150 W, while on the right-hand side in the Figure, an electrode 4 is shown, on the same scale, which can suitably be used in lamps having a power of 200 W and more. In order to optimize the temperature during operation at such high power, the cross-sectional area of both the core 5 and the wire 6 are increased, while the wire 6 is also wound in more layers around the core. As a result, the electrodes 4 for use in the high-power lamp have substantially larger dimensions than the electrodes 4' used in a conventional lamp, and they additionally have, in particular, a comparatively wide end portion.

Figure 3:
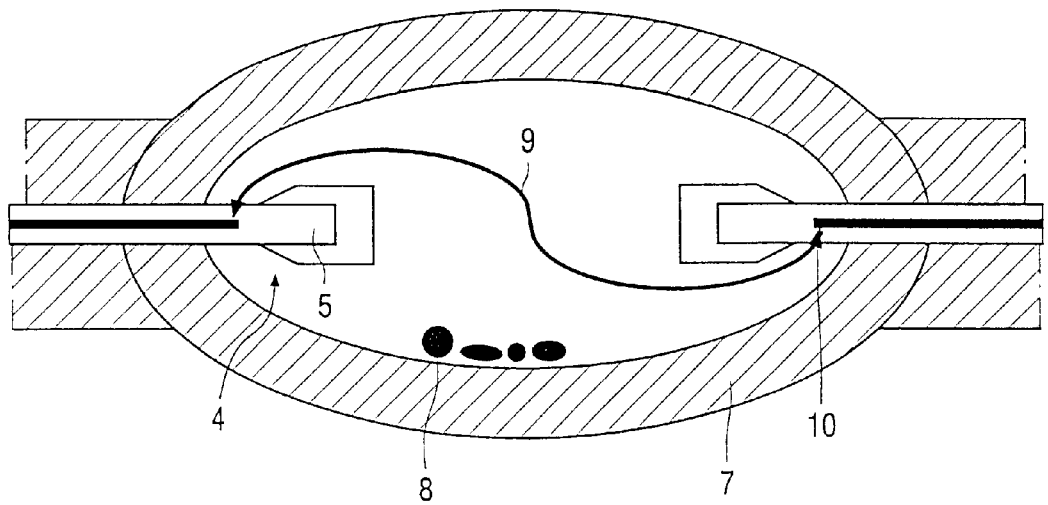
FIG. 3 diagrammatically shows a high-pressure mercury-vapor gas discharge lamp wherein a suboptimal discharge arc is maintained.
Figure 4:
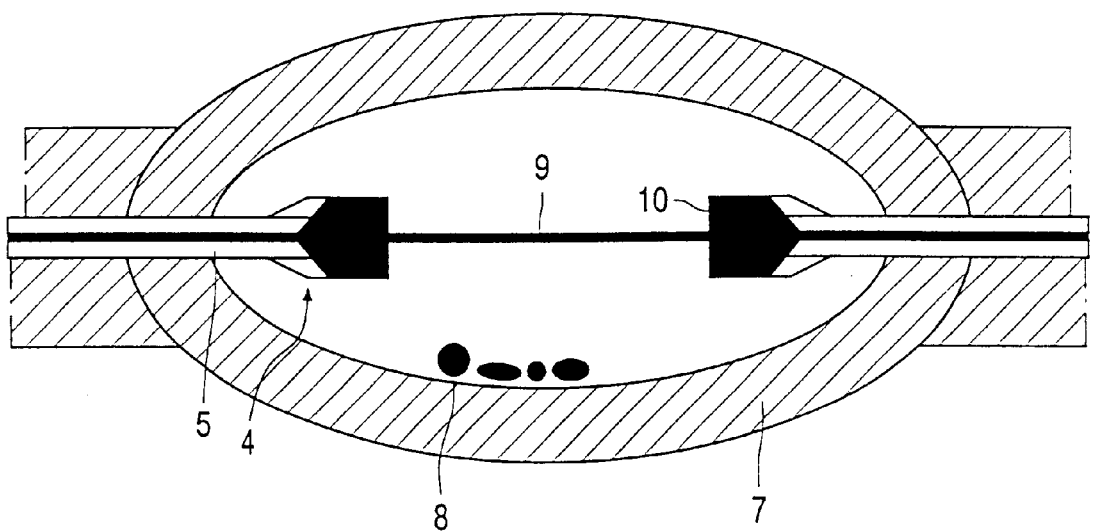
FIG. 4 diagrammatically shows a high-pressure mercury-vapor gas discharge lamp wherein an optimum discharge arc is maintained.

In accordance with FIGS. 3 and 4, a high-pressure mercury-vapor gas discharge lamp comprises a gastight tubular bulb 7 of quartz glass as the discharge vessel, wherein an electrode 4 is fused at both ends. The wide end portions of the electrodes 4 face each other, while the portions protruding from the bulb 7 are connected to the poles of the ballast 1 feeding the lamp. The mercury balls 8 which, in operation, provide for the necessary mercury vapor pressure are situated, in this case, at the bottom of the bulb 7, however, when the lamp cools down, the mercury often tends to deposit also on the narrower rear side of the electrodes 4.

FIG. 3 shows a discharge arc 9, which often develops during starting the lamp. The path which the current inside the electrode 4 follows and where, consequently, the electrode 4 is strongly heated, is diagrammatically shown in black. As a result of the mercury which has deposited on the rear side of the electrodes 4, the discharge, which chooses the line of least resistance, will leave the electrode 4 from the area 10 and extend in a suboptimal, curved path towards the opposite electrode 4. This effect is further enhanced by the fact that the comparatively narrow portion of the electrode 4, as compared to the wide front side, heats up more rapidly, resulting in an improved conduction at said location. Also the presence of a deposit of salt on and between the turns of the wire 6 of the electrode 4 impedes a good conduction at said location, thereby enhancing the formation of the suboptimal discharge arc 9 shown.

FIG. 4 shows an intended, optimum discharge arc 9 between the electrodes 4, the area 10, where the current leaves the electrode 4, being situated at the wide front side, and the arc 9 following the shortest path between the two electrodes 4.

The ballast 1 shown in FIG. 1 comprises a "switch mode" voltage generator, which is known per se, and which accommodates a down-converter (also referred to as Buck converter), a bridge circuit, which can provide for an AC voltage having a microcontroller-adjustable frequency, and a resonance circuit comprising, at least, a coil L and a capacitor C, which is responsible for enhancing and stabilizing the voltage and the current through the lamp. In this respect, the height of the voltage and hence the current intensity are also dependent upon the adjustable value of the frequency of the bridge circuit, said dependence also being governed by the dimensions that are chosen for the components of the resonance circuit.

Figure 5:
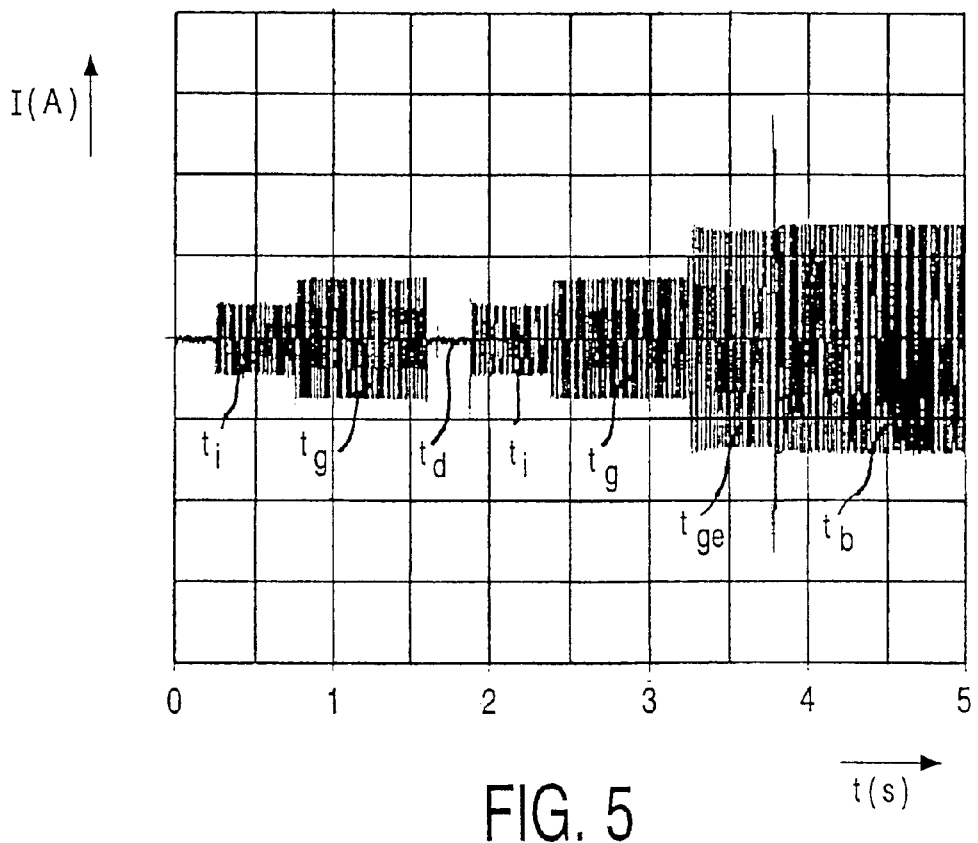
FIG. 5 shows, by way of example, a graph of the current intensity through the lamp plotted as a function of time in accordance with the invention.

By means of the graph shown in FIG. 5, it is explained how the intended, optimum discharge arc 5 shown in FIG. 4 is achieved. The graph is the result of a practical measurement and shows the alternating current strength I through the lamp plotted versus time t. The lamp is ignited by making the "switch mode" supply operate at a comparatively high frequency $f_i$ of 62.5 kHz during a first ignition period $t_i$ of 0.5 s, resulting in a high voltage of approximately 25 kV, leading to the generation of a discharge arc 9. For reasons described hereinabove, there is a substantial risk that this arc will assume a shape as shown in FIG. 3. Subsequently, the frequency of the power supply is reduced to a glow frequency $f_g$ of 20 kHz for a glow period $t_g$ of 0.85 s, as a result of which the current intensity increases because the impedance in the circuit decreases at a lower frequency. During this glow period, the electrodes 4 are heated strongly and the mercury evaporates from the electrodes 4. In this glow period, also any salts are removed from the electrodes 4.

In order to alter the shape of the discharge arc 9 from the shape shown in FIG. 3 to that shown in FIG. 4, the power supply is interrupted for an interruption period (or "dead"

period) $t_d$ of 300 ms, so that the discharge arc 9 disappears completely for a short period of time, and the temperature in the electrode is equalized. Subsequently, the start-up sequence $t_i$, $t_g$ is repeated. As the electrodes 4 now are free from mercury and salts, and are at a uniform, high temperature, an optimum discharge arc 9 as shown in FIG. 4 is formed. In order to further increase the current intensity through the lamp, and obtain a high light output, the glow period is extended by an end glow period $t_{ge}$ of 0.5 s, wherein the end glow frequency $f_g$ is at 15.5 kHz, and the coil L of the resonance circuit is short-circuited.

After this final start-up sequence, the power supply goes over to the continuous operating period $t_b$, wherein the operating frequency $f_b$ of the power supply is 90 Hz. At this stage, the lamp needs approximately 30 to 60 seconds to heat up completely, during which period the light intensity exhibits a further increase.

It has been established by experiment that the values mentioned in the description and in the claims enhance the proper operation of the ballast and the lamp, the operation of the lamp being stable after approximately 3.5 s.

What is claimed is:

1. A projection unit provided with a ballast for igniting and feeding a high-pressure gas discharge lamp, which ballast comprises:

output terminals for connecting the lamp, means for supplying the lamp during an ignition period ($t_i$) with an AC voltage at an ignition frequency (fi);

means for supplying the lamp with an AC voltage at a glow frequency (fg) during a glow period ($t_g$) following the ignition period (ti);

means for at least repeating the start-up sequence of ignition and glow periods ($t_i$, $t_g$);

means for feeding the lamp during an operating period ($t_b$) following a last start-up sequence; and means for interrupting the power supply to the lamp in a start-up sequence, which is not the last start-up sequence, during an interruption period ($t_d$) following the glow period ($t_g$).

2. A ballast for igniting and feeding a high-pressure gas discharge lamp, which ballast comprises:

output terminals for connecting the lamp, means for supplying the lamp during an ignition period ($t_i$) with an AC voltage at an ignition frequency (fi);

means for supplying the lamp with an AC voltage at a glow frequency (fg) during a glow period ($t_g$) following the ignition period (ti);

means for at least repeating the start-up sequence of ignition and glow periods ($t_i$, $t_g$);

means for feeding the lamp during an operating period ($t_b$) following a last start-up sequence; and means for interrupting the power supply to the lamp in a start-up sequence, which is not the last start-up sequence, during an interruption period ($t_d$) following the glow period ($t_g$).

3. A ballast as claimed in claim 2, characterized in that the ignition frequency ($f_i$) ranges between 30 kHz and 120 kHz, and the ignition period ($t_i$) ranges between 0.25 and 5 seconds.

4. A ballast as claimed in claim 2, characterized in that the ballast additionally comprises means capable of feeding the lamp, after the glow period ($t_g$) of the last start-up sequence during an end glow period ($t_{ge}$), at an end glow frequency ($f_{ge}$) which is smaller than the glow frequency ($f_g$).

5. A ballast as claimed in claim 2, characterized in that the ballast is provided with means for supplying the lamp with an AC voltage at an operating frequency ($f_b$), and in that the operating frequency ($f_b$) ranges between 50 Hz and 200 Hz.

6. A ballast as claimed in claim 2, characterized in that the glow frequency ($f_g$) ranges between 10 kHz and 40 kHz, and the glow period ($t_g$) ranges between 0.4 s and 1.7 s.

7. A ballast as claimed in claim 6, characterized in that the end glow frequency ($f_{ge}$) ranges between 8 kHz and 30 kHz and the end glow period ($t_{ge}$) ranges between 0.25 and 1 second.

8. A ballast as claimed in claim 2, characterized in that the interruption period ($t_d$) is long enough to substantially de-ionize the gas contained in the lamp.

9. A ballast as claimed in claim 2 or 8, characterized in that the interruption period ($t_d$) ranges between 50 ms and 500 ms, preferably between 250 ms and 350 ms.

10. A ballast as claimed in claim 2 or 8, characterized in that the glow frequency ($f_g$) is smaller than the ignition frequency ($f_i$).

* * * * *